Jan. 23, 1968  G. OTTERBACH ETAL  3,364,961
APPARATUS FOR LOPPING BRANCHES FROM A TREE TRUNK
Filed Feb. 14, 1966  2 Sheets-Sheet 1
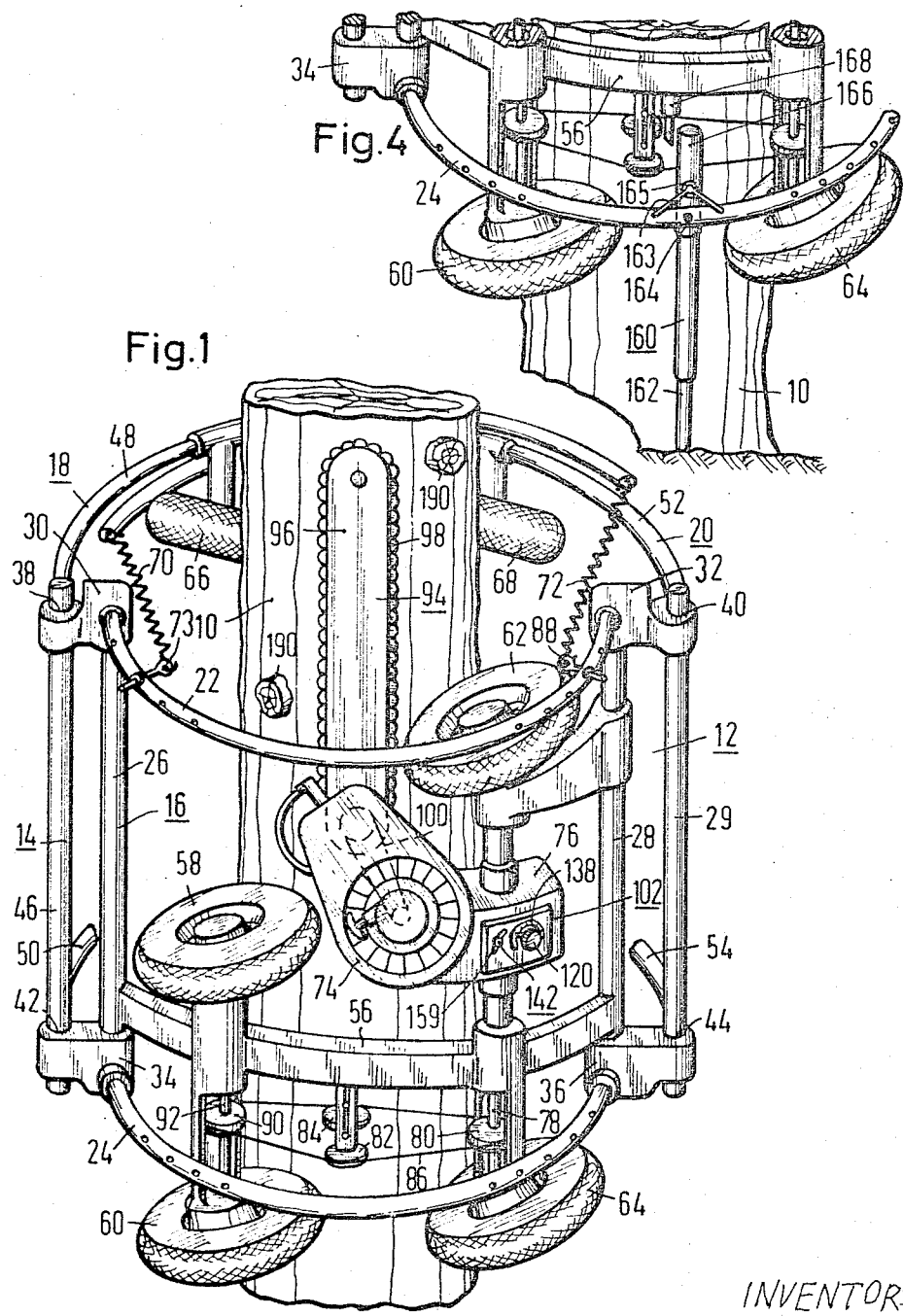
INVENTORS
Gerd Otterbach  Reinhard Kessler
By: Low and Berman
Agents Jan. 23, 1968     G. OTTERBACH ET AL     3,364,961
APPARATUS FOR LOPPING BRANCHES FROM A TREE TRUNK
Filed Feb. 14, 1966     2 Sheets-Sheet 2
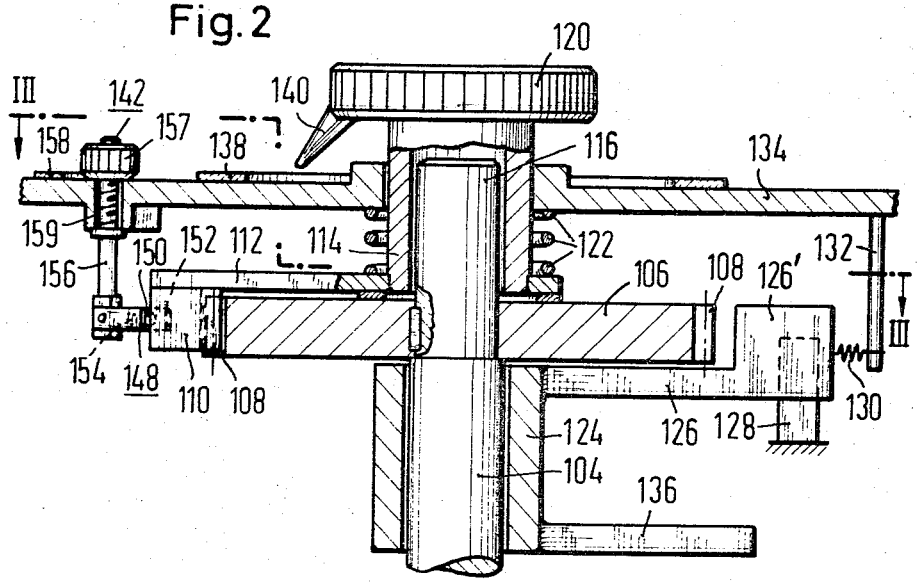
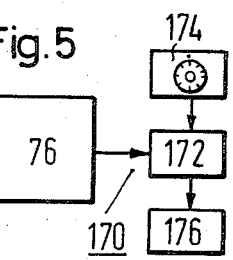
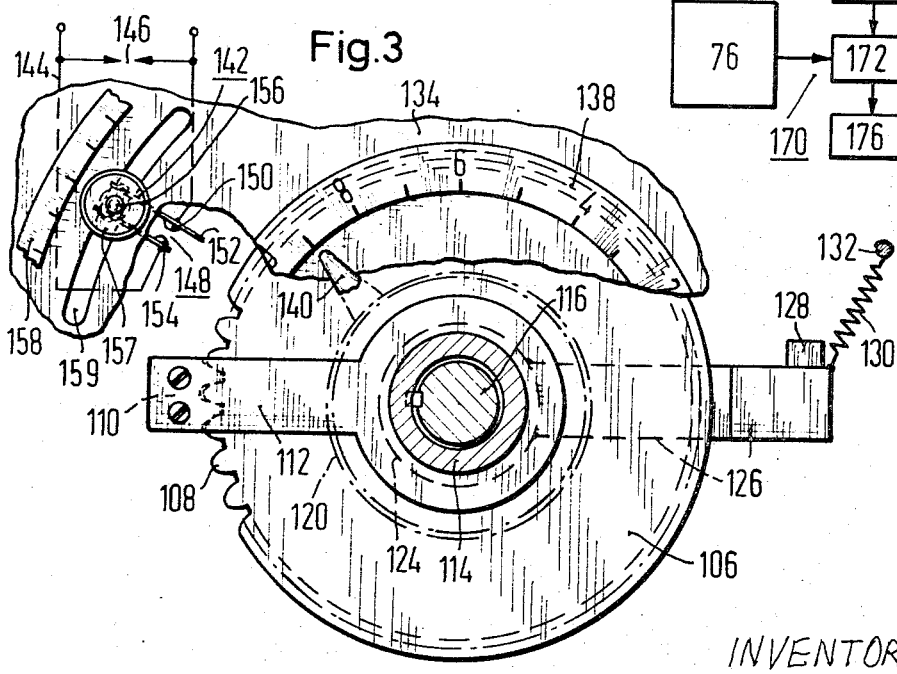
INVENTORS
Gerd Otterbach   Reinhard Kessler
By: Low and Berman
Agents

United States Patent Office 3,364,961
Patented Jan. 23, 1968

3,364,961
APPARATUS FOR LOPPING BRANCHES FROM A TREE TRUNK
Gert Otterbach and Reinhard Kessler, Schweinfurt, Germany, assignors to Fichtel & Sachs A.G., Schweinfurt, Germany
Filed Feb. 14, 1966, Ser. No. 527,300
Claims priority, application Germany, Feb. 19, 1965, F 45,288
13 Claims. (Cl. 144—2)

This invention relates to forestry equipment, and particularly to automatic apparatus for removing or lopping branches from the trunks of standing, living trees to a certain height from the ground.

It is known to remove branches from the lower trunk portions of standing or living trees by means of motorized devices which travel over the upright surface of the tree in a helical path and trim branches or other projections from the tree surface in order to reduce the number and size of defects in the lumber eventually produced from the tree.

The known devices move upward along the tree to a desired height and then return to the ground where their motor must be stopped by an operator before they hit the roots of the tree or the soil in order to avoid damage to the tree and the apparatus. It requires an operator of substantial skill to intercept the descending apparatus while it travels helically about the tree trunk without being injured by the device. The operator must observe the apparatus during its operation and cannot normally work with more than one such apparatus.

The primary object of the invention is the provision of apparatus for lopping branches from the trunk of a standing or living tree whose downward movement is stopped automatically at a predetermined distance above the ground.

With this object and others in view, as will hereinafter become apparent, the invention in one of its aspects mainly resides in a lopping aparatus which has a support equipped with guides adapted to guide the support in a substantially helical path about the trunk of a tree while the tree stands on the ground and its trunk is elongated in a vertically extending direction. A drive is provided to move the support upward and downward in its path so that cutting means mounted on the support may cut branches which project from the trunk toward the path. A control mechanism mounted on the support and operatively connected to the drive stops downward movement of the support in response to arrival of the support at a predetermined point of its path.

This point may be selected by the operator. The control mechanism may include sensing means for sensing the length or time of the downward movement or for sensing the distance of the support from the ground, and stopping means for stopping the downward movement in response to the sensed length, time, or distance.

The exact nature of this invention as well as other objects and advantages thereof will be readily apparent from consideration of the following specification relating to the annexed drawings in which:

FIG. 1 shows a branch lopping apparatus of the invention in operative position on a partially shown tree trunk in a perspective view, portions of the apparatus being broken away for the sake of clarity;

FIG. 2 shows the control device of the apparatus of FIG. 1 in enlarged, fragmentary, plan section;

FIG. 3 shows the device of FIG. 2 in elevation, and partly in section on the line III—III;

FIG. 4 illustrates a portion of a modified branch lopping apparatus of the invention in a view corresponding to that of FIG. 1; and FIG. 5 is a diagram of a modified control device for the apparatus of FIG. 1.

Referring now to the drawing in detail, and initially to FIG. 1, there is seen a portion of an upright tree trunk 10 on which a branch lopping apparatus 12 is arranged in its operative position. The operating elements of the apparatus are mounted on a supporting annular frame 14 consisting mainly of three parts 16, 18, 20 which are circumferentially offset about the common axis of the tree and of the apparatus, the frame parts 18, 20 being hingedly attached to the central frame part 16.

The frame part 16 includes two axially spaced arcuate bars 22, 24 extending in respective radial or horizontal planes and two circumferentially spaced axial or vertical rods 26, 28. The bars and rods are fixedly fastened to each other by connectors 30, 32, 34, 36 each of which has an integral bearing lug 38, 40, 42, 44.

The frame part 18 is constituted by a vertical rod 46 journaled in the bearing lugs 38, 42 and by two identical and identically arranged horizontal arcuate bars 48, 50 fixedly attached to the ends of the rod 46, the bar 50 and associated elements being partly omitted for the sake of clarity. The frame part 20 is similarly constituted by a vertical rod 29 journaled in the bearing lugs 40, 44, and arcuate bars 52, 54 fixedly attached to the ends of the rod 29, the lower bar 54 again being partly omitted.

The drive and the cutting device of the apparatus are mounted on an inner frame 56 attached to the rods 26, 28 of the central frame part 16. The drive includes two pairs of wheels 58, 60, 62, 64. The drive wheels cooperate with idler or guide wheels 66, 68 on the upper bars 48, 52 of the frame parts 18, 20 and similar, non-illustrated wheels on the omitted portions of the lower bars 50, 54. All wheels are inclined at the same angle relative to the axis of the tree trunk, and are held in engagement with the bark or surface of the trunk 10 by helical tension springs 70, 72 which connect the free ends of the bars 48, 52 to hooks 73, 88 secured to the bar 22 by engagement with openings in the bar 22 arranged in longitudinal rows so as to permit the frame 14 to be expanded and contracted as needed to hold the wheels in resilient engagement with the trunk 10. It will be understood that the bars 50, 54 are biased toward the tree trunk 10 by non-illustrated springs in the same manner as explicitly illustrated with reference to bars 48, 52.

The wheels on the inner frame 56 are driven by a conventional single-cylinder internal combustion engine 74 whose crankshaft is connected to a drive shaft 78 by a gear transmission 76. Bevel gears, not themselves shown, connect the shaft 78 to the wheels 62, 64. The transmission 76 is equipped with a control device 102 of which only an adjusting knob 120 and the setting mechanism of a stopping device 142 are visible in FIG. 1.

The drive wheels 58, 60 are connected to the drive shaft 78 by a belt 86 trained over a drive pulley 80 on the shaft 78, two guide pulleys 82, 84, and a driven pulley 90 on the common drive shaft 92 of the wheels 58, 60, the last-mentioned wheels being connected to the shaft 92 by bevel gears, not shown.

A chain saw 94 is mounted on the casing of the engine 74. The saw includes a guide bar 96 and a saw chain 98, and is connected to the crankshaft of the engine by a drive chain 100 and associated sprockets. The saw chain 98 is moved by the engine 74 in a plane approximately parallel to the nearest part of the tree trunk 10, and lops branches 190 from the trunk when the frame 14 travels around the trunk in an approximately helical path determined by the inclination of the wheel axes.

The control device 102 is seen in more detail in FIGS. 2 and 3. It includes a control shaft 104 which is connected with the drive shaft 78 by a worm and worm wheel (not shown) in such a manner that the control shaft 104 makes less than one revolution during the normal upward or downward movement of the supporting frame 14 on the tree trunk 10. The reduced free end portion 116 of the shaft 104 carries a circumferentially toothed circular control disc 106 whose teeth 108 normally engage mating teeth on a control cam 110. The cam is mounted on the outer end of a radial arm 112 fixedly attached to a sleeve 114 which movably envelops the free shaft end portion 116 and movably projects through an outer wall 134 of the control device 102 to carry the afore-mentioned control knob 120. A helical compression spring 122 interposed between the wall 134 and the arm 112 urges the knob 120 inward toward the illustrated position. The position of the cam 110 on the control disc 106 can be changed by axially withdrawing the knob 120 and thereafter turning the same to an angular position which may be read from a scale 138 on the outer face of the wall 134 cooperating with a pointer 140 on the knob 120.

Another sleeve 124 coaxially rotatable on the main portion of the control shaft 104 carries a radial arm 126 whose free end portion 126' is axially offset into the raidial plane of the teeth 108 and the normal path of the cam 110. The arm 126 is secured in its axial position by a helical tension spring 130 attached to a pin 132 on the inner face of the wall 134. The spring normally holds the arm 126 in circumferential abutment against a stationary stop 128.

The axial end of the sleeve 124 remote from the control disc 106 carries the operating arm 136 of a reverse motion device, not otherwise shown, which is interposed in the transmission 76 between the engine 74 and the drive shaft 78 for reversing the direction of rotation of the drive wheels 58, 60, 62, 64. The reverse motion device may be entirely conventional, and may be of the type illustrated in "A Manual of Mechanical Movements" by Will M. Clark (Garden City Publishing Co., Inc., Garden City, N.Y., 1943), page 193, FIG. 39.

The afore-mentioned stopping device 142 is associated with the ignition system which energizes the engine 74, only the spark gap 146 of the ignition system being conventionally shown in FIG. 3. A normally open disabling switch 148 is shunted across the gap 146 by means of conductors 144. The movable contact 150 of the switch is mounted on a spring blade 152 which projects into the normal path of the cam 110 and acts as a sensing device for sensing the arrival of the descending apparatus at the intended end point of its downward movement. The blade 152 and the fixed contact 154 of the switch are mounted on a rod 156 the position of which may be adjusted along an arcuate slot 159 in the wall 134 coaxial with the shaft 104. The adjusted position of the rod 156 may be fixed by means of a knob 157 threadedly mounted on the rod on the outer face of the wall 134. A scale 158 near the slot 159 indicates the angular position of the switch 148.

The afore-described apparatus is operated as follows:

The frame 14 is fastened at a convenient level, say one yard above ground, about a tree trunk by releasing the springs 70, 72, swinging the frame parts 18, 20 apart to permit the wheels 58, 60, 62, 64 to be brought in contact with the bark of the tree to be worked on and closing the frame 14 which is securely held to the tree by the several guide and drive wheels under the resilient force of the springs 70, 72.

The operator sets the pointer 140 to a desired maximum cutting height indicated on the scale 138, and the knob 157 to a desired stopping height for the downward movement of the apparatus indicated on the scale 158. He then starts the engine 74. When the upward spiraling movement of the apparatus 12 starts, his attention is no longer required, and he may occupy himself elsewhere, for example, start the lopping of branches from another tree by repeating the afore-described steps with another identical apparatus 12.

While the first-mentioned apparatus is moved upward on the tree by the rotary movement of its drive wheels, the control shaft 104 is slowly turned in a clockwise direction, as viewed in FIG. 3. The cam 110 abuttingly engages the spring blade 152 and deflects it away from the stationary contact 154 of the switch 148 until the cam clears the blade, and the latter reverts to the illustrated position. The cam 110 eventually engages the free end 126' of the arm 126 and entrains the arm 126 against the restraint of the spring 132, thereby pivoting the operating arm 136 of the reverse motion device until the latter reverses the direction of wheel movement.

A manually releasable latch (not shown) holds the arm 136 while the cam 110 slowly moves counterclockwise toward the original position, and the branch lopping apparatus descends in its helical path about the tree trunk. When the cam 110 next abuttingly engages the blade 152, the disabling switch 148 is closed and short-circuits the ignition gap 146, thereby deenergizing the engine 74 and stopping further downward movement of the apparatus 12 against the frictional resistance of the motion transmitting train and of other elements connected with the drive wheels.

The apparatus then stands idle at a safe distance from the ground until the operator is ready to transfer it to another tree and to start another cycle of operations by releasing the non-illustrated latch of the reverse motion device, setting the knobs 120, 157, and again starting the engine.

The distance at which the apparatus 12 is stopped in its downward movement is precisely predictable if the configuration of the tree trunk and of its bark are such as to hold slipping of the drive wheels within narrow limits, and the branches to be cut do not offer excessive resistance to the movement of the apparatus during its upward travel. If the drive wheels spin idly, the cam 110 is advanced without corresponding movement of the apparatus 12. An experienced operator readily makes suitable allowance for factors which tend to reduce the maximum height reached by the apparatus when selecting the settings of the knobs 120, 157.

The modified device partly illustrated in FIG. 4 stops the downward movement of the apparatus 12 at a fixedly predetermined level regardless of wheel slippage or resistance of branches to cutting.

The lower frame bar 24 of the apparatus carries a stopping device 150 which includes a telescopically extendable, somewhat resilient sensing rod 162 attached to the bar 24 by a pivot 164 whose axis is approximately radial relative to the tree axis or to the axis of the helical path of apparatus movement. The rod 162 is normally held in the illustrated position by a spring latch 163 on the bar 24 which releasably engages a recess 165 in the top end 166 of the rod 162 projecting upward from the bar 24.

A disabling switch 168 substantially identical in structure and function with the afore-described switch 148 is mounted on the frame 14 in such a manner that it is closed by abutting engagement of the sensing rod end 166 when the rod tilts counterclockwise from the position shown in FIG. 4. Such tilting is caused during spiraling downward movement of the apparatus when the bottom end of the rod 162 engages the ground, whereby the movement of the apparatus is stopped in the same manner as described above with reference to FIGS. 1 to 3. It will be understood that the apparatus of FIG. 4 differs from that shown in FIGS. 1 to 3 only by the stopping device 160 which replaces the device 142 described above. The distance above ground at which the apparatus stops may be adjusted by lengthening or shortening the rod 162.

A further modification of the control device shown in FIGS. 2 and 3 is illustrated in the block diagram of FIG. 5. The illustrated stopping arrangement 170 includes a relay 172 provided with a time delay mechanism 174 whose delay period can be adjusted. The relay is connected to the transmission 76 of the motor 74 and operates a shunting or disabling switch 176 arranged in the manner of the afore-described switch 148.

The time responsive stopping apparatus shown in FIG. 5 may be combined with the control mechanism shown in FIGS. 2 and 3 instead of the stopping device 142 in the following manner:

The relay 172 is energized by the transmission 76 when downward movement of the apparatus 12 on the tree trunk 10 starts or at a time fixedly related to the start of downward movement. A switch whose contacts are respectedly mounted on the arm portion 126′ and the stop 128 may provide a starting signal for the relay 172, but other obvious arrangements will readily suggest themselves. When the time delay set on the timing device 174 has passed, the relay 172 closes the switch 176 which de-energizes the engine 74 as described above with reference to the switch 148. The time delay set on the device 174 thus determines the time during which the apparatus 12 may move downwardly in its path, and stops the movement when the set time has elapsed.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed:

1. Apparatus for lopping branches from the trunk of a tree comprising, in combination:
   (a) a support;
   (b) guide means for guiding said support in a substantially helical path about the trunk of a tree while the tree stands on the ground, and the trunk thereof is elongated in a vertically extending direction;
   (c) drive means for moving said support upward and downward in said path;
   (d) cutting means on said support for cutting branches projecting from said trunk toward said path during said movement of the support; and
   (e) control means on said support and operatively connected to said drive means for stopping the downward movement of said support in said path in response to arrival of said support at a predetermined point of said path.

2. Apparatus as set forth in claim 1, further comprising selecting means for selecting said point, said drive means including means for moving said support upward in said path to a predetermined height, and downward from said height, said control means including sensing means for sensing the length of the movement of said support in a downward direction, and stopping means responsive to a sensed length of said path selected by said selecting means for stopping said downward movement.

3. Apparatus as set forth in claim 1, wherein said drive means include a motor, at least one drive wheel, and motion transmitting means operatively connecting said motor to said wheel for joint rotation, said motor, said wheel, and said motion transmitting means being mounted on said support, and said wheel engaging said trunk during said movement of the support, said motion transmitting means including motion reversing means for reversing the direction of rotation of said wheel, said control means including means for actuating said reversing means in response to a predetermined upward movement of said support in said path.

4. Apparatus as set forth in claim 3, wherein said control means include a control member operatively connected to said wheel for angular movement when said wheel rotates, cam means mounted on said control member for joint angular movement, said drive means further including energizing means for energizing said motor, said cam means engaging said energizing means in a predetermined angular position of said control member for stopping said motor, the control means further including selecting means for varying the angular position of said cam means on said control member, said means for actuating said reversing means being operatively connected to said control member for reversing the direction of rotation of said wheel in response to a selected angular position of said control member.

5. Apparatus as set forth in claim 4, wherein said energizing means include abutment means engageable by said cam means and responsive to angular movement of the cam means in one direction for stopping said motor while permitting continued rotation of said motor when said cam means engages said abutment means during angular movement of the cam means in a direction opposite to said one direction.

6. Apparatus as set forth in claim 5, wherein said abutment means include a resilient member mounted on said support for deflection by said cam means during engagement thereby, and disabling means selectively responsive to deflection of said resilient member in one direction for disabling said motor.

7. Apparatus as set forth in claim 1, wherein said control means include sensing means on said support for sensing the distance between said support and the ground, and disabling means responsive to a predetermined sensed distance for stopping said drive means.

8. Apparatus as set forth in claim 7, further comprising selecting means for selecting said distance.

9. Apparatus as set forth in claim 7, wherein said sensing means include a sensing member downwardly projecting from said support and mounted on said support for tilting movement about an axis extending in the direction of a radius of said helical path, whereby said sensing member is tilted about said axis by engagement with the ground during said downward movement of the support, said disabling means responding to the tilting for stopping said drive means.

10. Apparatus as set forth in claim 9, wherein said sensing member is a telescopically extendable rod elongated in a vertically extending direction.

11. Apparatus as set forth in claim 1, wherein said control means include timing means for sensing the time of movement of said support in said path, and disabling means operatively connected to said timing means and responsive to a predetermined sensed time for stopping said drive means.

12. Apparatus as set forth in claim 11, wherein said timing means sense the time of downward movement of said support, and said disabling means respond to a predetermined sensed time of downward support movement.

13. Apparatus as set forth in claim 1, wherein said drive means include an internal combustion engine including electrically operated ignition means for energizing the engine, said control means include shunting means for short-circuiting said ignition means.

References Cited

UNITED STATES PATENTS

| | | | |
|---|---|---|---|
| 2,482,392 | 2/1949 | Whitaker | 144—2 |
| 3,030,986 | 4/1962 | Longert | 144—2 |
| 3,315,714 | 4/1967 | Meier | 144—2 XR |

WILLIAM W. DYER, JR., *Primary Examiner.*

W. D. BRAY, *Assistant Examiner.*